United States Patent [19]

Ross et al.

[11] Patent Number: 5,115,314
[45] Date of Patent: May 19, 1992

[54] VIDEO KEYING CIRCUITRY INCORPORATING TIME DIVISION MULTIPLEXING

[75] Inventors: John D. Ross; David A. Ross, both of Iroquois, Canada

[73] Assignee: Ross Video Limited, Iroquois, Ontario, Canada

[21] Appl. No.: 514,019

[22] Filed: Apr. 26, 1990

[51] Int. Cl.$^5$ .......................................... H04N 5/275
[52] U.S. Cl. ................................... 358/183; 358/182; 358/181
[58] Field of Search ............ 358/183, 182, 22, 22 CK, 358/172, 178, 180, 181

[56] References Cited

U.S. PATENT DOCUMENTS

| | | | |
|---|---|---|---|
| 4,205,346 | 5/1980 | Ross | 358/182 |
| 4,356,511 | 10/1982 | Tsujimura | 358/181 |
| 4,392,156 | 7/1983 | Duca et al. | 358/183 |
| 4,488,169 | 12/1984 | Yamamoto | 358/22 CK |
| 4,758,892 | 7/1988 | Bloomfield | 358/22 |
| 4,779,135 | 10/1988 | Judd | 358/180 |
| 4,805,022 | 2/1989 | Abt | 358/183 |
| 4,873,568 | 10/1989 | Jackson et al. | 358/22 |
| 4,947,255 | 8/1990 | Jackson et al. | 358/183 |
| 4,991,014 | 2/1991 | Takahashi et al. | 358/22 |
| 5,003,303 | 3/1991 | Kellar et al. | 358/183 |
| 5,010,407 | 4/1991 | Trytko | 358/22 |
| 5,046,165 | 9/1991 | Pearman et al. | 358/183 |

Primary Examiner—James J. Groody
Assistant Examiner—Jeffrey S. Murrell
Attorney, Agent, or Firm—Sixbey, Friedman, Leedom & Ferguson

[57] ABSTRACT

Multi-keying circuitry for inserting a plurality of keys into a background television signal where at least the keying signal processing circuitry is time shared by control circuitry to effect the key insertions. The control circuitry includes dual port rams and RAM-DAC's to facilitate the time share operation. Circuitry for effecting transitions between the keys either individually or in groups is disclosed as is circuitry for previewing the keys or the transitions thereto either individually or in groups.

44 Claims, 13 Drawing Sheets

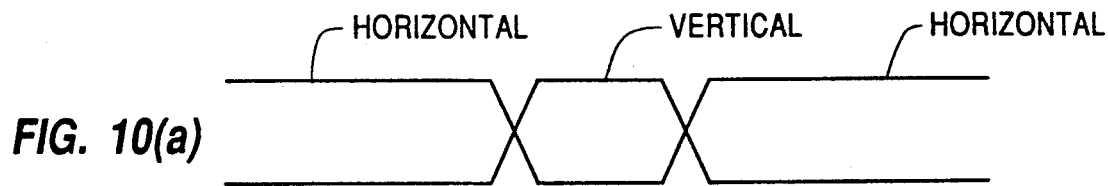
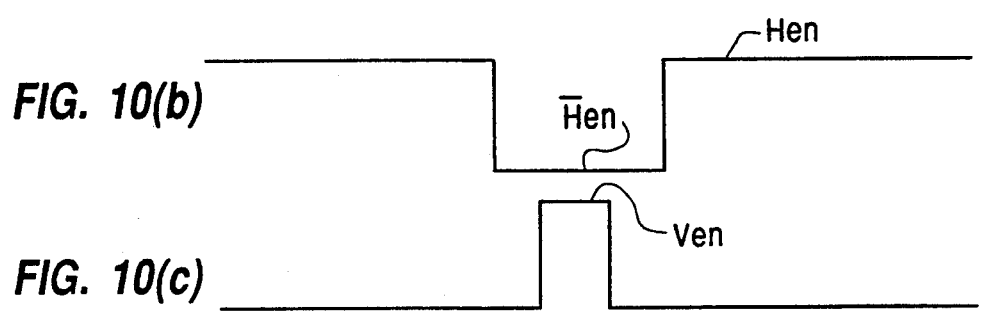
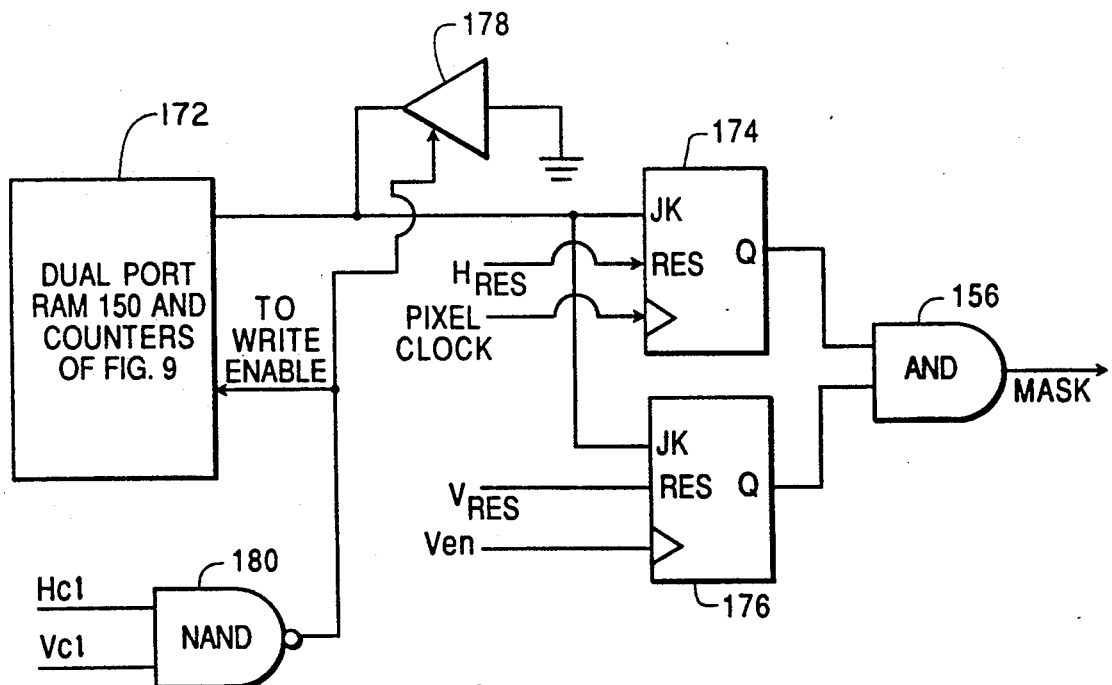
FIG. 11

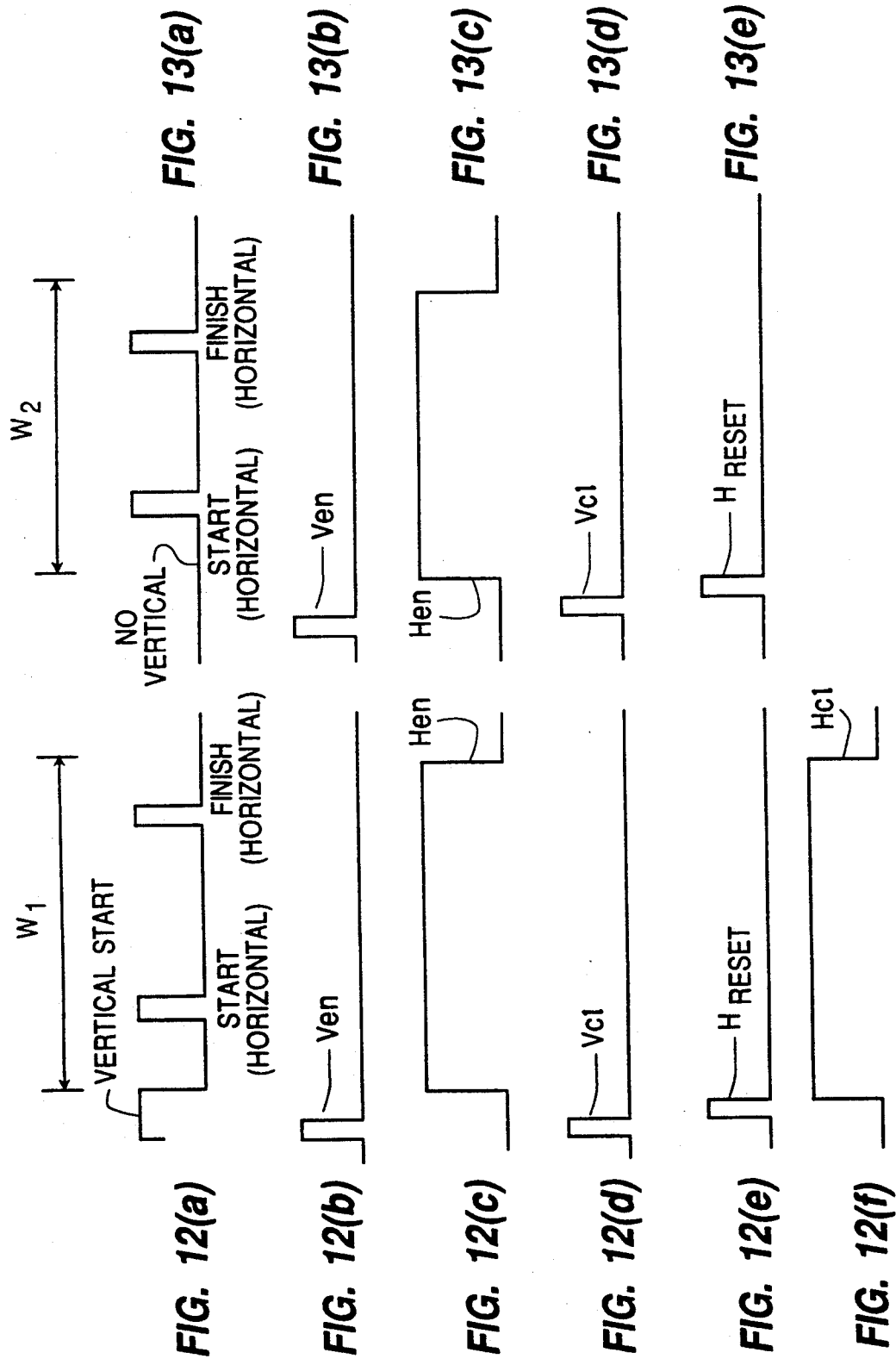

VIDEO KEYING CIRCUITRY INCORPORATING TIME DIVISION MULTIPLEXING

BACKGROUND AND SUMMARY OF THE INVENTION

This invention relates to multi-keying circuitry for keying several fill video signals such as titles into a background television video signal in response to keying signals.

In particular, the present invention provides an economical and operationally attractive means of simultaneously keying such titles or other sources into a television picture.

It was the realization that such fill video signals (or keys) usually each occupy a defined area of the screen that made it possible to design a multikeyer in which the innovative idea is the time-sharing of circuits. The circuit functions are adapted in each screen area by parameters which define the requirements of each key.

This system takes advantage of the fact that in most keying situations, when it is desired to have a number of simultaneous titles, they are generally not placed over one another in layers, rather they each occupy various defined areas of the TV screen. It is usual to start with a basic picture, upon which a number of keyed images such as titles, messages or other keying sources are individually placed in some desired sequence. Such keyed images may later be removed either separately or in groups.

For example, much of TV production is directed to the making of commercials. Such commercials are composed by editing pre-recorded material. During the editing process, titles and other image material are added using a video keying process Because the location where these images are to be placed on the screen is known in advance, the area of the screen where a particular title, etc. is to be placed may be defined, usually by describing a suitably placed rectangle. Such rectangles are usually non-overlapping and shall be referred to as masks. A mask defines the limits of an area in which a keyed image having a particular set of parameters may exist. This invention however is not restricted to the use of rectangular masks, this simply being a function of the mask generator design. The rules for satisfactorily dealing with overlapping masks may also be defined.

An important object of this invention is therefore the provision of a multi-keyer which time shares circuitry associated with or ancillary to the video keying process. The resultant multiple usage of complex circuits provides a very economical alternative to the keying approach of prior art, which required a separate set of keying and ancillary circuits for each keyed area on a television picture. The time-sharing system has been designed to respond with sufficient rapidity that the keying and ancillary circuits may be sequentially configured with the parameters which may simultaneously exist in separate areas of a television screen.

It is a further object of this invention to provide improved control circuitry for time sharing the keying circuits of a multi-keyer.

As a further object of this invention to employ dual port rams to facilitate the time sharing of the keying circuits of a multi-keyer.

It is a further object of the invention to use, in a time sharing multi-keyer, a digital-to-analog convertor such as a RAM-DAC (which is typically used for video picture signals) as a digital-to-analog convertor for digitized linear (or analog) control parameters associated with the keyed images.

It is a further object of this invention to provide, in a multi-keyer, improved circuitry for effecting transitions between keyed images either separately or in groups.

It is a further object of the invention to provide, in a multi-keyer, improved circuitry for previewing not only the keyed areas but also the transitions thereto.

These and other objects of the invention will become apparent from a reading of the specification taken with the appended drawings and claims.

DESCRIPTION OF THE DRAWINGS

FIGS. 10(a) through 10(c) are illustrative waveforms which occur in the circuitry of FIG. 9.

FIG. 11 is a block diagram of further illustrative mask generating circuitry in accordance with the invention.

FIGS. 12(a) through 12(f) and 13(a) through 13(e) are waveforms which illustrate the operation of the circuitry of FIG. 11.

DETAILED DESCRIPTION OF THE PREFERRED EMBODIMENTS OF THE INVENTION

Figure 1:
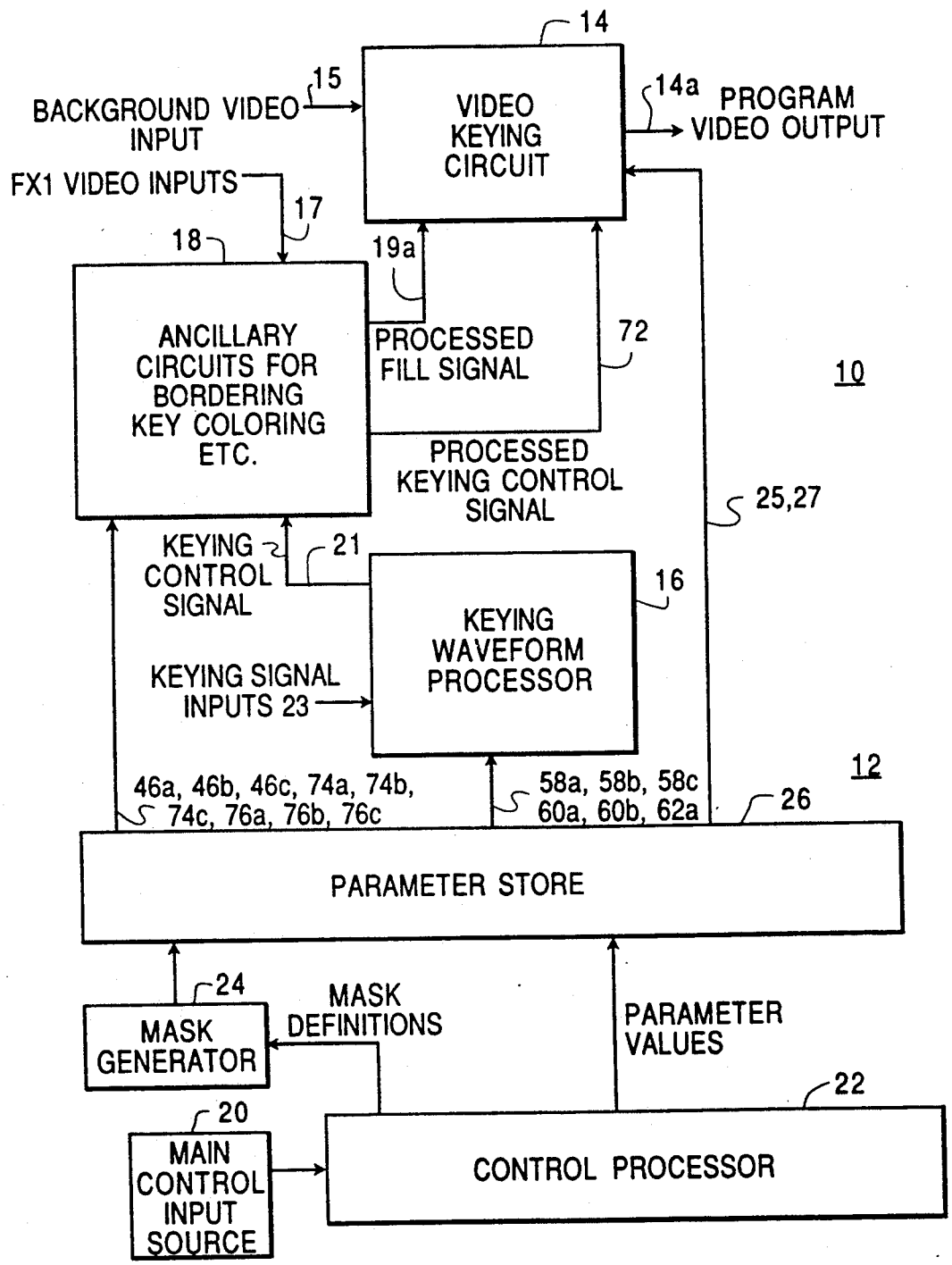
FIG. 1 is a block diagram of an illustrative basic system in accordance with the invention.

Reference should be made to the drawing where like reference numerals refer to like elements.

In general, as can be seen in FIG. 1, the multikeyer of the present invention includes circuitry associated with or ancillary to the keying process, this circuitry being generally indicated at 10 and control circuitry generally indicated at 12. The circuitry 10 includes video keying circuitry 14, keying waveform processor 16 and ancillary circuits 18 for the bordering, coloring, etc. of keys.

More particularly, an input of background video to which the keys are to be added is applied over line 15 to video keying circuitry 14. Circuitry 14 combines two video signals, one of them being the background (program) signal and the other being the processed fill signal applied over line 19. The relative proportions of the background and fill signals may be determined by one or more processed keying signals applied over line 72. Typically circuit 14 may comprise, as is known, a two-input mixing circuit having a single cross-fade control signal (keying signal) input although other circuits having independent level control of the two signals rather than a simple cross-fade control means are possible and may be desirable for certain types of keyed image situations. U.S. Pat. Nos. 3,560,638 and 4,864,388, assigned to the assignee of the present application and incorporated herein by reference, disclose keying circuits which may be used in the present invention.

A key waveform processing circuit 16 produces a suitable Waveform for acting as the processed keying control signal for video keying circuit 14. Circuit 16 has inputs 23 for the keying sources and control inputs 58a, 58b, 60a, 60b, and 62a for controlling such factors as clip level and clip gain.

Optional ancillary circuits 18 provide means for modifying the keying control signal and the fill video signal to provide different modifications of the keyed image such as various bordering effects Control circuitry 12 includes main control input source 20 for inputting control commands, control processor 22, mask generator 24, and parameter store 26.

As will be described below, to the basic form of this invention may be added means of previewing keys, prior to their being directed to main (program) output 14a and means for effecting transitions and means for previewing the transitions.

Since masks are used to define the limits of the areas in which the fill video signals (or keys) are placed or inserted in the picture signal in response to a keying signal, the fill video signal, which lies within a particular mask area, is assigned certain characteristics or "keying parameters". For example, such parameters might typically include the following:

1) KEYING MODE a) VIDEO KEY. Retains the original color of the fill video signal.

b) MATTE KEY. the fill video signal (or key) is artificially colored.

c) NON-ADD KEY. A non-additive keying process is employed.

2) MATTE KEY PARAMETERS If the key is to be artificially colored, the color may be defined in terms of color parameters such as hue, saturation and luminance values. Other means of defining color parameters may alternatively be devised.

EDGE AND BORDER PARAMETERS a) All-around border is provided for the key.

b) Drop-Shadow for a three-dimensional effect of the key is provided.

c) Key outlined in color.

d) Intensity of the edge of the key may be varied.

4) KEYING SIGNAL (OR WAVEFORM) PARAMETERS a) Clip level of the keying signal may be varied.

b) Keying gain (also known as softness) of the keying signal may be varied.

c) Key waveform inversion.

5) INPUT SELECTION a) Keying signal Input (one or more of n)

b) Fill Video Input (one or more of n)

6) Other parameters may define whether the key is to blink on and off, etc.

The invention may be implemented by employing both analog and digital technology or solely digital technology.

Figure 2:
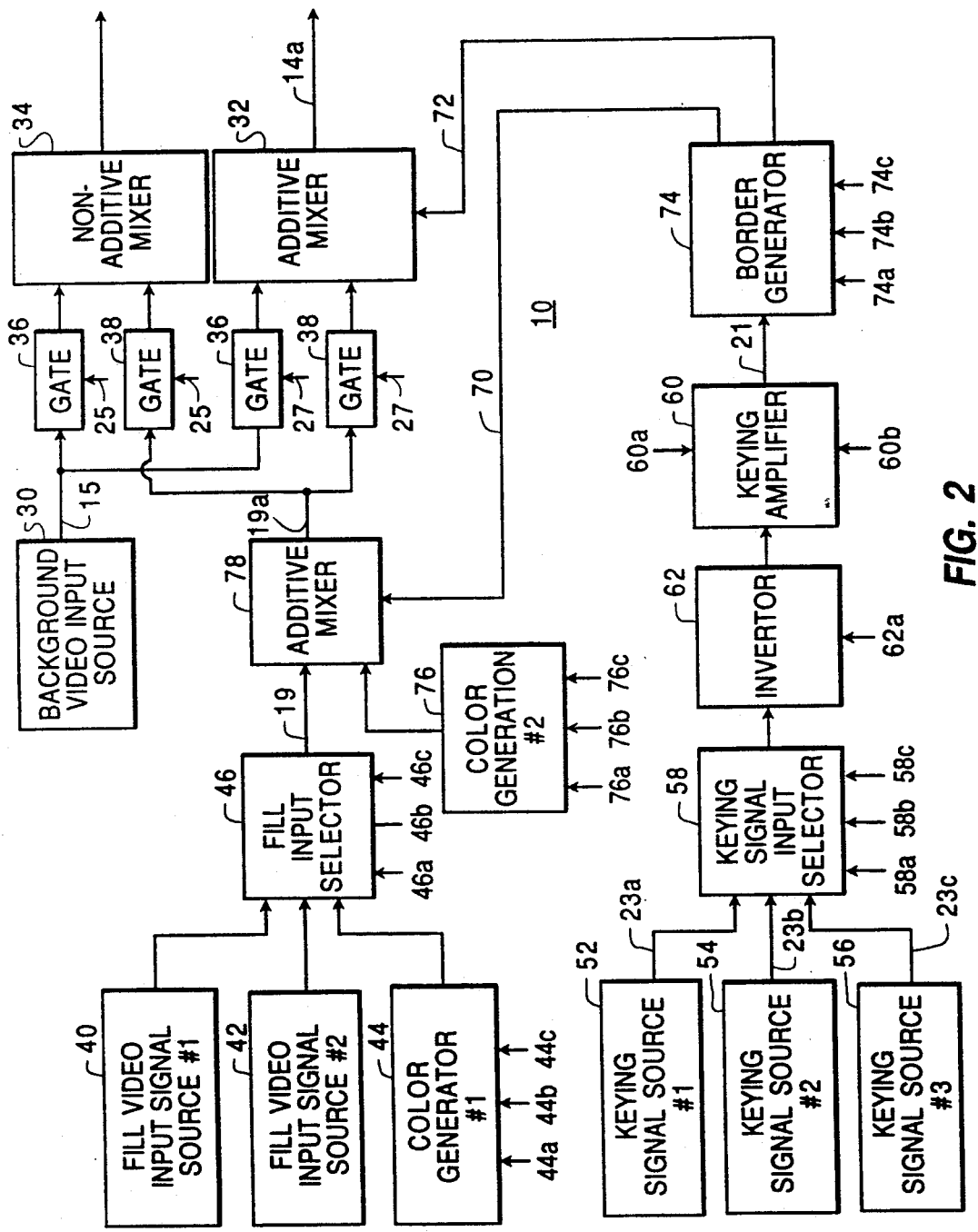
FIG. 2 is a block diagram of illustrative circuitry associated with or ancillary to the video keying process in accordance with the invention.

Referring now to FIG. 2, the circuitry 10 of FIG. 1 is illustrated in greater detail. In particular, a background video input source 30 applies the background video signal to an additive mixer 32 or a non-additive mixer 34 via gates 36 and 38 respectively. The operation of mixers 32 and 34 is exclusive that is, either one or the other is selected via gates 36 and 38. Gates 36 and 38 are actuated in a time share manner as will be described in more detail with respect to control circuitry 12.

The fill video input signals (or keys) may be respectively applied from sources 40, 42 and 44. These sources may be a character generator for producing a title or any other appropriate fill video source. Moreover, if the key is to be colored, color generator 44 for producing a TV color signal is provided. The hue, saturation, and luminance control inputs 44a, 44b, and 44c may also be provided on a time share basis in accordance with the invention. Sources 40-44 may be selected by a fill input selector 46 which operates under the control of a binary control signal applied over lines 46a, 46b, and 46c where the binary control signal may be applied on a time share basis in accordance with the invention. Although only three fill sources 40-44 are shown, it is understood that the number of such sources can be as many as are needed to provide various kinds of keying into the background signal.

The selected fill input signal on line 19 is applied to an additive mixer 78. The output of a color generator 76 is applied to the second input of additive mixer 78. Color generator 76 operates in a time-shared manner similar to color generator 44 in response to control signals over lines 76a, 76b, and 76c. Additive mixer 78 provides a means of keying the output of color generator 76 into the selected fill signal on line 19 in order to produce colored edges on keyed signals during border, drop-shadow or outline keying effects, under the control of a keying waveform on line 70. The processed fill signal on line 19a is applied to either additive mixer 32 or non-additive mixer 34 via gates 36 or 38 respectively.

Keying signal sources 52 - 56 are also provided to cut in a known manner a hole in the background signal whereby the fill video signal is inserted or keyed into the hole cut by the keying signal. One or more of the keying signal sources is selected by keying signal input selector 58 under the control of a binary control signal applied over lines 58a, 58b, and 58c where the binary control signal may be applied on a time share basis in accordance with the invention. The selected keying signal(s) is applied to an inverting circuit 62 which may or may not invert the selected keying signal depending on the value of the digital control signal applied thereto over line 62a.

The output of inverting circuit 62 is applied to a keying amplifier 60, the keying gain and softness of which and the clipping level of which may be controlled by analogue control signals respectively applied to 60a and 60b where the analogue control signals may be applied on a time share basis in accordance with the invention.

The output of keying amplifier 60 is applied to border generator circuit 74. This circuit acts on the keying waveform on line 21 to produce output keying waveforms on lines 70 and 72. Border generator 74 may be operated in any of a several known modes to produce keying waveforms on lines 70 and 72 suitable to cause normal keying or border, drop shadow and outline effects to occur as observed at the output of additive mixer 32. The operating mode of border generator 74 is selected under the control of a binary control signal applied over lines 74a, 74b and 74c where the binary control signal may be applied on a time share basis in accordance with the invention.

Each of the circuit elements 30-78 is known and conventional and thus no further description thereof is given. Moreover, the control signals applied to these circuits may be the control signal conventionally applied to these circuits where the control signals would be applied in a time share manner in accordance with the invention.

Illustrative control circuitry 12 for time share generating (or multiplexing) the various control signals employed in connection with the circuit elements 30-78 will now be described. As discussed above, the active picture may be divided into individual mask areas which may be rectangular or some other shape and may or may not overlap where for each mask at least one fill video signal and at least one keying signal are selected together the control parameters for use with that mask where the control parameters correspond to the control signals employed in connection with circuit elements 30-78. In general, the control signals are changed on a real-time basis. Thus, they can be changed several times per television line, as discussed below with respect 4-6.

As discussed above the parameters inside each area (or mask) are typically of two types on-off digital or variable analogue values Typical uses for each are (a) digital values such as key selection at selector 58; video fill selection at selector 46;- and key invert at invertor 62; and (b) analogue values such as key slice level over line 60b; and key softness over line 60a.

In the following FIGS. 3-17, illustrative control circuitry will be described with respect to the time multiplexing of the key inversion digital control signal, applied to line 62a of FIG. 2 and the time multiplexing of the keying gain (or softess) analogue control signal applied to like 60a. As will be evident from the following description, the control circuitry of FIGS. 3-17 can be readily expanded to the time multiplexing of all of the digital and analog control values since the key inversion digital control signal and the key softness analog control signal have been arbitrarily chosen to illustrate the operation of the control circuitry.

Figure 3:
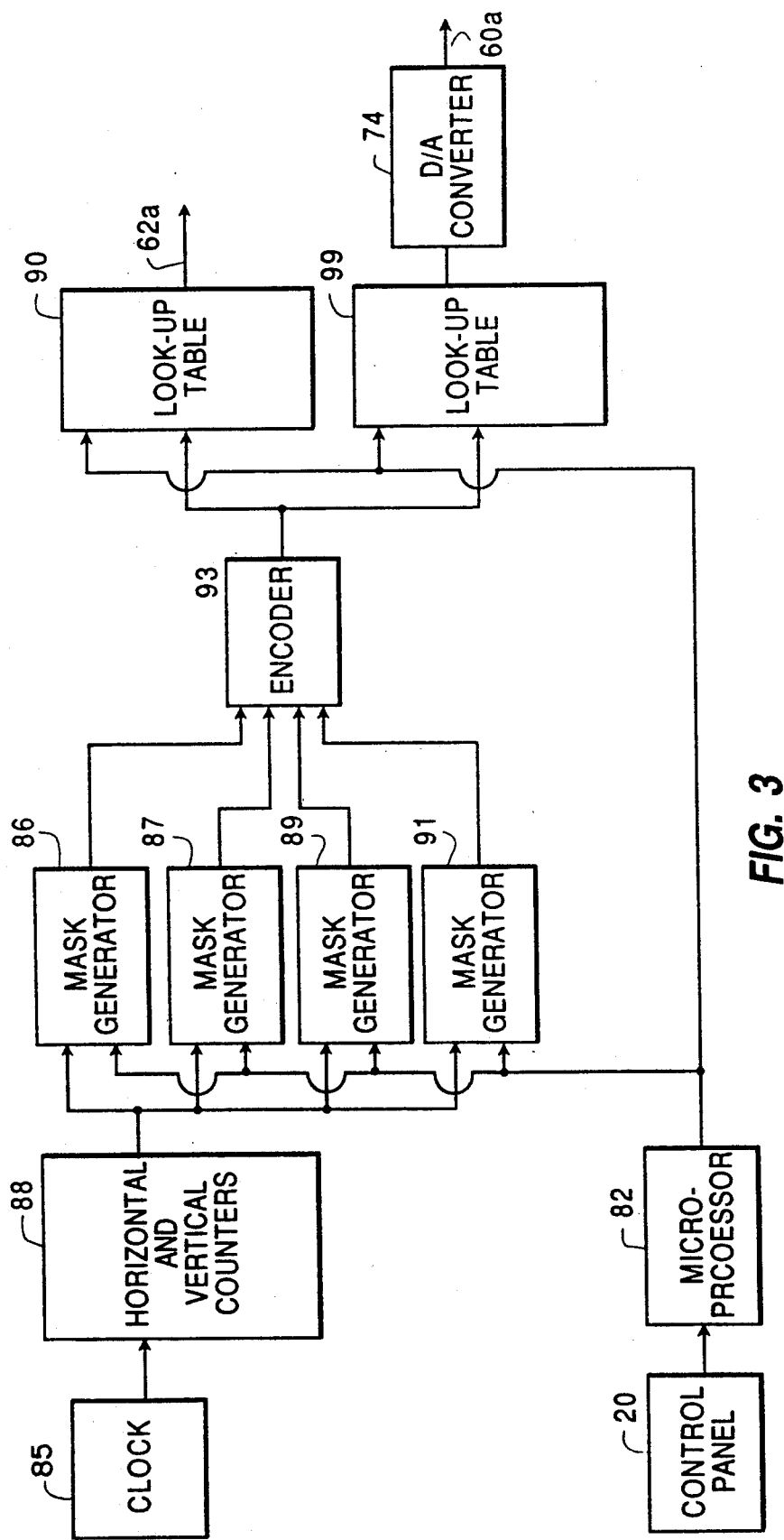
FIG. 3 is a block diagram of illustrative control circuitry for use with the circuitry of FIG. 2.
Figure 4:
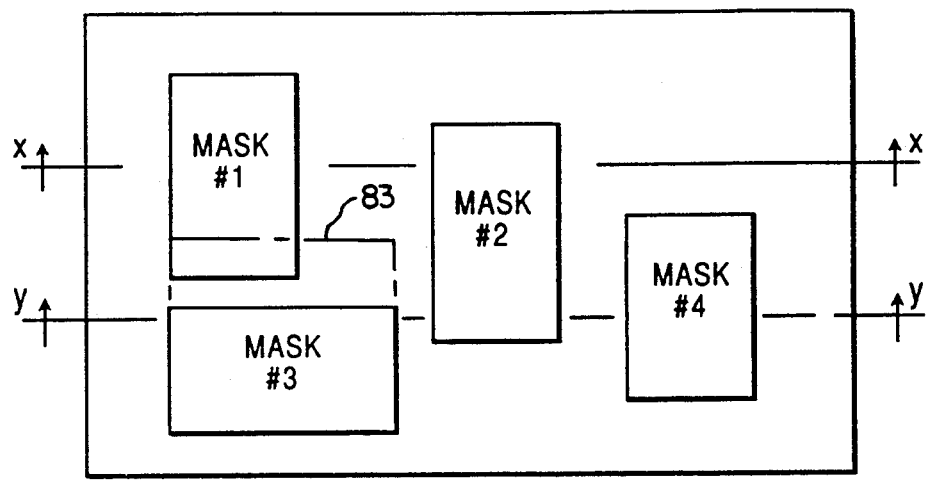
FIG. 4 is a diagrammatic illustration of a television picture having four mask areas to illustrate the operation of the mask generators of the control circuitry of FIG. 3.

FIG. 3 generally illustrates control circuitry 12 for time sharing the circuitry 10 of FIGS. 1 and 2 where the mask areas correspond to mask areas 1-4 of FIG. 4 for purposes of illustration. Moreover, it will be assumed that key inversion occurs in mask areas 1, 2, and 4 and that.. the digitized analogue values of the keying amplifier gain are 32, 96, 184, and 8 respectively for mask areas 1-4.

Accordingly, look up table (LUT) 90 is provided to store key inversion digital control values, while LUI 99 stores the key softners analogue control values, it being assumed each location of LUT 99 comprises eight bits to thus provide 256 possible digitized analogue values for each analogue control signal.

It is assumed in the example of FIG. 4 that the maximum number of mask areas is four although the maximum number may be more or less where typically the number is eight where six, for example select individual keys and fills and their control parameters and the others may act as modifiers for any two other masks.

Accordingly, four locations are allotted in each of LUT's 90 and 99 for the four situations where (a) mask area 1 is not overlapped by mask 2, 3, or 4, (b) area 2 is not overlapped by the other mask areas, (c) area 3 is not overlapped, and (d) area 4 is not overlapped. Memory locations in LUT's 90 and 99 may be provided to handle the various combinations of possible overlapping situations and this will be further discussed below. Moreover, one additional location may be provided for those areas where there is no mask. Hence, sixteen memory locations will be provided in each of LUT's 90 and 99, where five of these .locations in each LUT are allocated as described and the remaining locations are provided as described below, to accommodate overlapping situations.

In order to read the control signals stored in the LUT's in synchronization with the television scanning process and the definition of corresponding mask locations on the television raster, four mask generators 86, 87, 89, and 91 are provided where the masks generators respectively correspond to masks 1-4. The mask generators operate under the control of (a) a microprocessor 82 (which corresponds to processor 22 of FIG. 1) such as a Motorola 68000 and (b) a set of horizontal and° ,vertical counters 88, controlled by a master clock 85 phased locked to the input video signal.

The microprocessor 82 operates under the control of control panel 20, which panel includes suitable means for the manual entry of data to define the desired operation of the system. Such a panel typically includes push buttons, potentiometers, and visual means of confirming one selections made, as is conventional. Accordingly, the control panel would include means for defining all of the digital and variable analogues of the parameters to be employed inside each mask area, such means being conventionally employed in the control panels of video production switchers. Moreover, the control panel 20 employs means for defining the locations of the masks with respect to the raster, the latter means also being conventionally employed in the control panels of video production switchers.

Figure 5A:
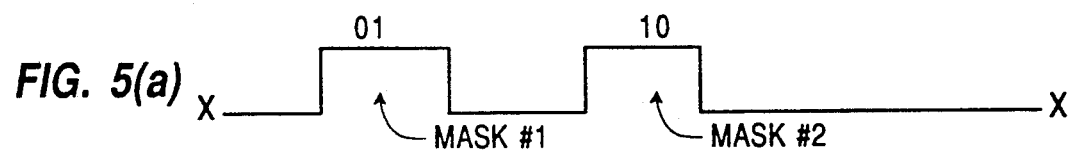
FIGS. 5(a) and 5(b) are waveforms of illustrative mask generator output signals for lines x-x and y-y of FIG. 4.
Figure 5B:
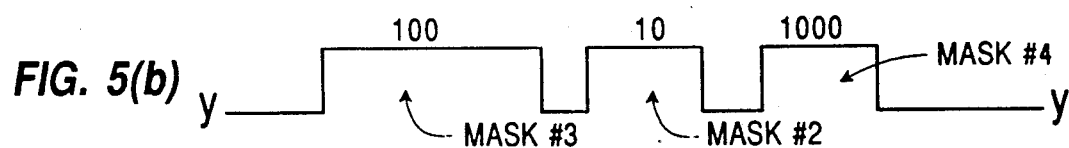

The output of each mask generator is a logic signal which is high during the box output as indicated in FIGS. 5(a) and 5(b) where these outputs change periodically during the active television picture. In order to generate the digital control signals, the mask outputs are applied via an encoder 93 as addresses to LUT 90 whereby the LUT translates the mask addresses into a new data output which constitutes the digital control signals corresponding to the key invert control signals for each of the mask areas 1-4. Encoder 93 has as inputs the four outputs from the mask generators and may generate in a known manner a 00 address when no mask is applied, a 01 address when mask 1 is applied, a 10 address when mask 2 is applied, a 100 address when mask 3 is applied, and a 100 address when mask 4 is applied, addresses are also generated whenever masks overlap, as will be further described with respect to FIG. 7. The LUT is also periodically written by processor 82 as will be described with respect to FIGS. 14 and 15.

FIGS. 5(a) illustrates the encoded address waveform obtained from encoder 93 at line x—x of FIG. 4 while the encoded address waveform at line y—y of FIG. 4 is shown in FIG. 5(b).

Figure 6A:
FIGS. 6(a) and 6(d) are waveforms of illustrative output signals produced by the control circuitry of FIG. 3.
Figure 6B:
Figure 6C:
Figure 6D:

FIGS. 6(a) through 6(d) show, for masks 1 through 4, the key inversion digital control signals outputted from LUT 90 to control line 62a of keying signal invertor 62 of FIG. 2. As assumed above, key inversion does not occur for mask 3 and this is indicated in FIG. 6(c). Shown in dotted lines is the control signal which would occur if key inversion were The number of LUT's case be increased to provide more digital control signals. Thus, if the number of digital control signals is twenty four, twenty four LUT's would be used where the LUT's may be incorporated into a single chip using different known techniques. Thus, for example, each control signal may be assigned a different memory plane of a memory where each location is one byte (or eight bits or memory planes)

A second type of LUT 9 is used to provide analogue control signals such as the keying gain control. In this case the LUT may provide an eight bit output as discussed above which is applied to a digital-to-analogue convertor (DAC) 94 resulting in the keying gain analogue control signal applied to control line 60a of keying signal amplifier 60 of FIG. 2. The combined functions of LUT 99 and DAC 94 are available as a RAM-DAC component such as the BT478 manufactured by Brooktree. This RAM-DAC has heretofore been typically used to convert digitized video signals to analogue video signals However, in the present invention an extremely fast digital-to-analogue converter such as the above RAM-DAC is utilized to convert digitized control signals to analogue control signals. Thus, in this invention, the RAM-DAC is used for control signals as opposed to video signals and, in particular, for control signals which may very rapidly change in value (that is, from one mask to the next) along a single line of a television picture raster.

Figure 7:
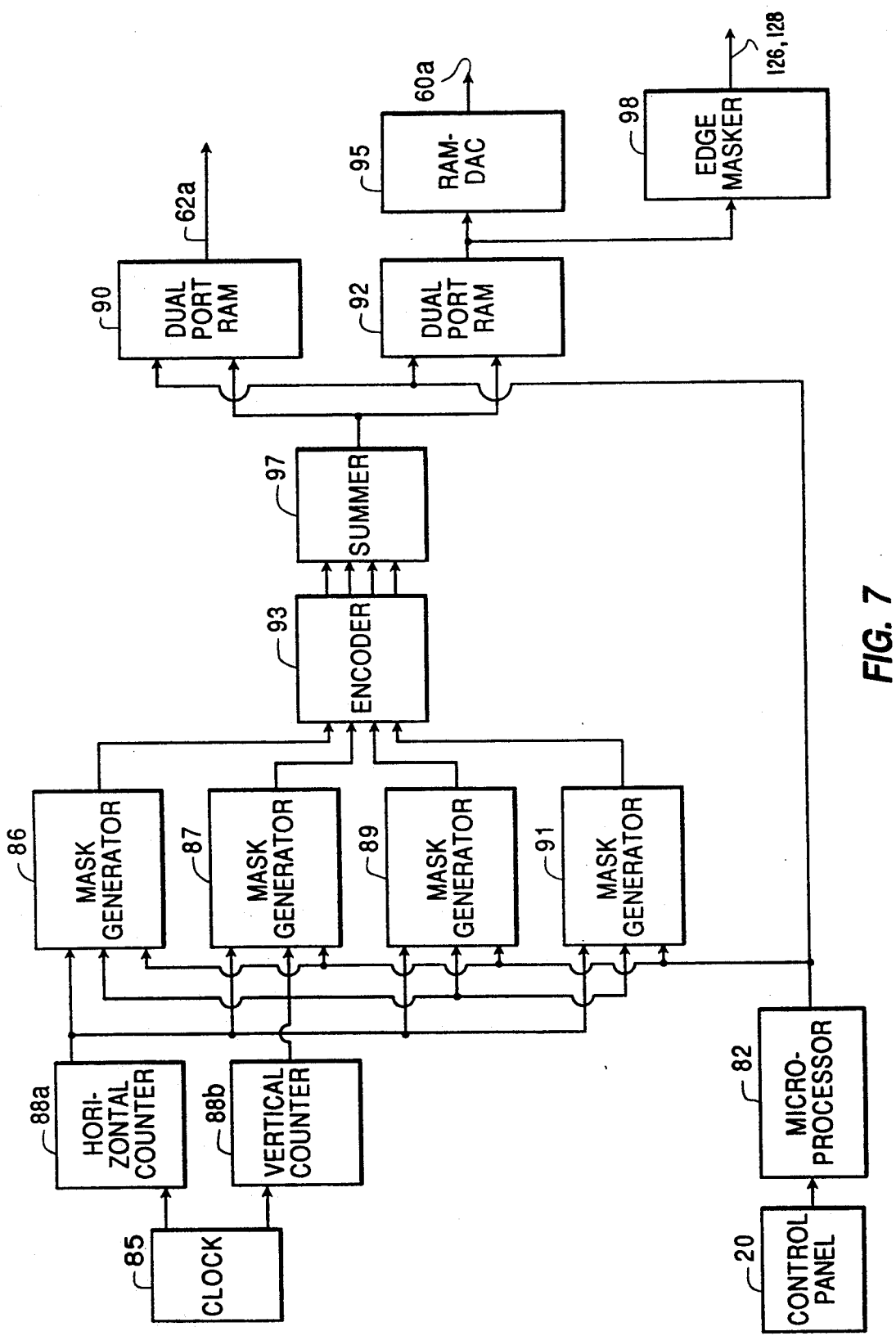
FIG. 7 is a block diagram illustrating in further detail the control circuitry of FIG. 3.

The control system of FIG. 3 is shown in more detail in FIG. 7. It is controlled by processor 82 which writes to (a) the mask generators, (b) a pair of dual port rams (DPR's) 90 and 92, and (c) a RAM-DAC 95. Dual port ram or LUT 90 controls the functions which require digital values, as discussed above. RAM-DAC 95 combines the functions of LUT 99 and DAC 94.

Dual port ram 92 is used as a priority LUT and is written to output the number of the mask with the highest priority whenever mask overlap is selected by the operator. This output can only be one of four masks and thus the DPR 92 output is encoded as a two bit value, which is then used as the address for the RAM-DAC 95. This in turn outputs the keying gain analogue control signals over line 60a where only the values of the mask with the highest priority are output whenever mask overlap occurs.

As indicated above, each mask is preferably assigned a binary weighted value to accommodate mask overlap—that is, mask 1, value 1; mask 2, value 2; mask 3, value 4; mask 4, value 8. It being assumed there are a maximum of four masks, this results in a four bit binary number with 16 possibilities including overlapping (or combinations) of masks. Some functions such as key/fill video selection permit more than one mask to be on at any time. In other cases such as key invert and all the analogue control values, only one mask may be valid at a time. With respect to the analogue control values, this may be managed by using dual port RAM 92 as a priority encoder. Moreover, this dual port ram may also be preferably used to resolve key invert conflicts although another technique for resolving this conflict may also be employed, as described below.

Using DPR 92 to resolve the potential conflict between analog control values, suppose masks 1 and 3 are on together and only mask 3 is to be output. The actual priority is decided by the operator. In particular, assume the digitized analog values of the keying amplifier gain assumed hereinbefore (that is, 32, 96, 184 and 8 are respectively stored in the four locations of RAM-DAC 95 for the mask areas 1-4 of FIG. 4 and assuming mask areas 1 and 3 overlap, as indicated by phantomline the digitized analog value of 184 must be selected from the third memory location of RAM-DAC 95 since mask area 3 has been assigned priority over mask area 1.

The priority is established as follows. During the time masks 1 and 3 overlap, the addresses assigned to mask generators 1 and 3, that is, the addresses 001 and 100, will be applied to summing circuit 97 where the sum of 101 will be obtained This sum is used to address DPR 92 and in address location 101 of DPR 92 will be stored binary 10—that is the address of the third memory location of RAM-DAC 95. In this third memory location is stored the digitized value of the keying gain analogue control signal associated with mask 3. Hence, in this manner the conflict between masks 1 and 3 is resolved with respect to analog control values. As indicated above, the contents of address location 101 of DPR 92 may be established either under operator control from console 84 or preprogrammed. When preprogrammed, the program would operate on the basis that whenever there is a conflict between mask areas 1 and 3, for example, mask area 3 would be assigned priority.

With respect to digital control signals and, in particular, the keying version signal stored in DPR 90, it is again assumed there is a mask overlap between mask areas 1 and 3 and that mask area 3 is assigned priority over mask area 1. This means that the keying invert control signal assigned to mask area 3 will be assigned priority if mask area 3 overlaps with mask area 1. As assumed above, key inversion occurs in mask area 1 and does not occur in mask area 3. Hence, a ONE will be stored in the memory location of DPR 90 assigned to mask generator 86—that is, memory address 01, while a ZERO will be stored in the memory location assigned to mask generator 89—that is, memory address 100. When mask areas 1 and 3 overlap, the above addresses will be summed at summer 97 thus resulting in the memory address 101. Stored in memory address 101 of DPR 90 will be a ZERO, which corresponds to the value of a control signal associated with mask area 3 and thus, upon a conflict between mask areas 1 and 3, the output from DPR 90 will be from memory location 101 to accordingly prevent key inversion.

To further illustrate the situation where certain digital control functions such as key video selection may overlap, assume that keying signal source 52 is associated with mask area 3 and keying signal source 54 is associated with mask area 4 and further assume that if mask areas 3 and 4 overlap, both of the keying signal sources should be employed, the address of mask generator 91 is 1000 while that of mask generator 89 is 100 and thus the sum of these is 1100. Stored in the latter location of DPR 90 will be a keying signal select signal 011 to be applied over lines 58a through 58c respectively to thus effect simultaneous keying by keying sources 52 and 54. That is, since keying source 52 is designated 001 and since source 54 is designated 010 and since the sum of these designations is 011, they are both selected by the keying signal select signal 011. Thus, since the keying select signals are 3 bits long (or 3 memory planes, for example), selection of any combination of the keying signal sources 52-56 may be effected.

Figure 8:
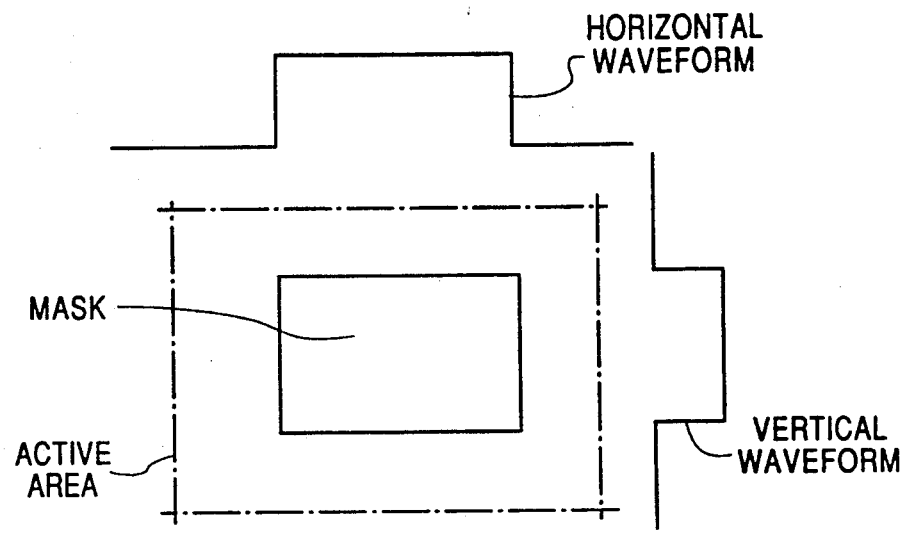
FIG. 8 depicts horizontal and vertical waveforms which respectively define the horizontal and vertical dimensions of a typical rectangular mask employed in the invention.
Figure 9:
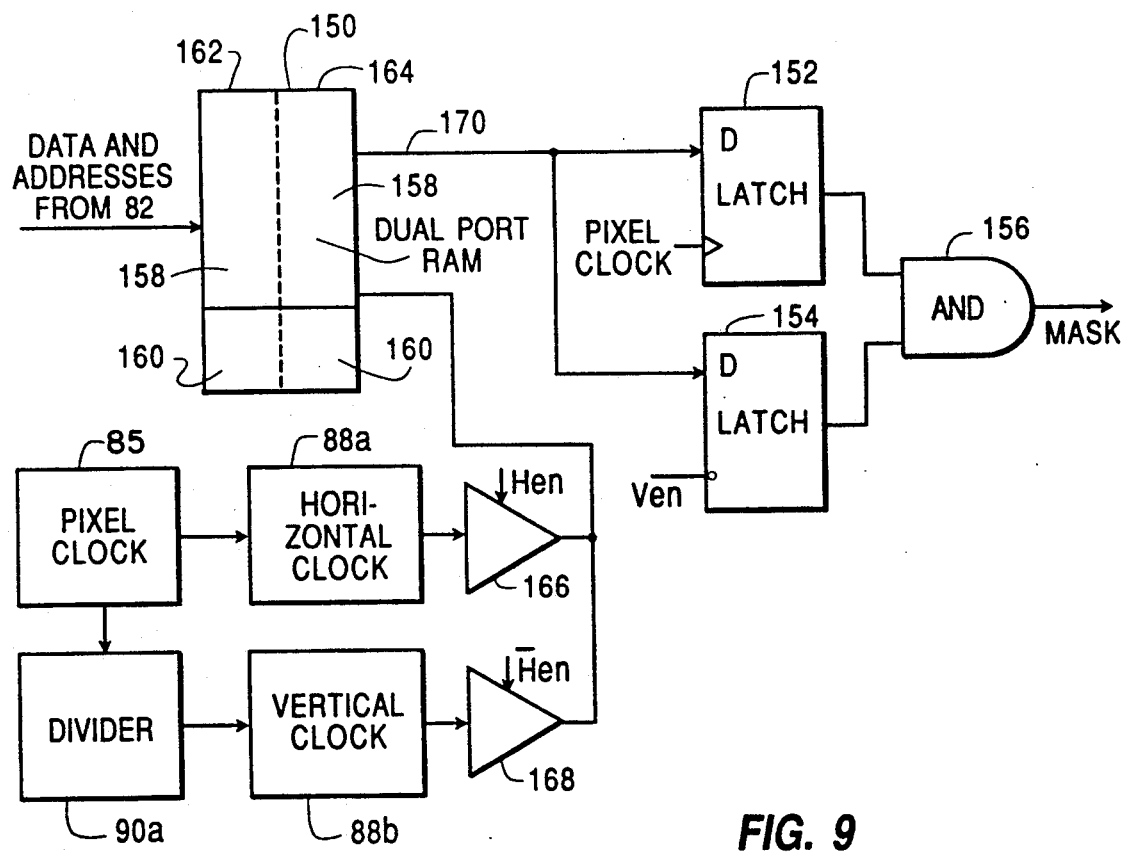
FIG. 9 is a block diagram of an illustrative mask generator in accordance with the invention.

Reference should now be made to FIGS. 8-10 for a description of a first embodiment of one of the mask generators 86, 87, 89, or 91 of FIG. 7. In particular, the mask generator includes a dual port ram 150, the output of which is applied to a horizontal waveform latch 152 and a vertical waveform latch 154, the outputs of the latches being applied to an AND circuit 156. The output of the AND circuit is applied to encoder 93 of FIG. 3.

Latch 152 generates the horizontal waveform shown in FIG. 8 while latch 154 generates the vertical waveform. As can be seen in FIG. 8 the horizontal and vertical waveforms respectively define the horizontal and vertical dimensions of a rectangular mask where the mask can be any one of the masks 1-4 of FIG. 4.

Also shown in FIG. 8 is the active area of the television picture which typically is defined as being 910 pixels per line and 625/525 lines per frame (313/263 lines per field). For sake of illustration, it is assumed the horizontal waveform extends from pixel 220 to pixel 470 in the horizontal direction and from line 50 to line 180 in the vertical direction. Accordingly, two sections are provided in dual port ram 150, the first section 158 storing data relating to the horizontal waveform and the second section 160 storing data relating to the vertical waveform of FIG. 8. As will be described below with respect to FIGS. 14 and 15, dual port ram 150 is provided to facilitate writing of data by processor 82 into a first page 162 of dual port ram 150 while data is being read from a second page 164 thereof. Thus, typically, during a particular frame, data will be read from page 164 while fresh data is being read into page 162. During the next frame, the data written into page 162 will be read and new data will be written into page 164.

Each of the pages 162 and 164 are divided into horizontal waveform section 158 and vertical waveform section 160. Assuming the horizontal waveform is as defined above, each of the sections 158 will contain 910 memory locations corresponding to the 910 pixels per line. ZERO's will be stored in locations 1-219 and 471-910. ONE's will be stored in memory locations 220-470 to thus define the horizontal waveform of FIG. 8 in the horizontal waveform sections 158 of DPR 150.

In a similar manner, the vertical waveform data is stored in the vertical waveform section 160 of the DPR. In particular, ZERO's will be stored in memory locations 1-49 and 181-525 (assuming 525 lines per frame) while ONE's will be written into memory locations 50-180 by processor 82 to thus define the vertical waveform.

In order to read the above horizontal and vertical waveform data from DPR 150, pixel clock 85 is utilized together with divider 90a, horizontal counter 88a and vertical counter 88b. The pixel (horizontal) clock rate is 13.5MHz giving 910 pixels per line and 625/525 lines per frame. The outputs of the counters 88a and 88b are applied to buffers 166 and 168, the outputs of these buffers being applied to an input address of the dual port ram which selects either horizontal waveform section 158 or vertical waveform section 160.

Referring to FIGS. 10(a)-10(c), which illustrates waveforms for use with the circuitry of FIG. 9. FIG. 10(a) illustrates the output occurring on line 170, the horizontal data being read from section 158 and the vertical data being read from section 160. The horizontal entry waveform Hen (FIG. 10(b)) is applied to buffer 166 and the invert thereof Hen is applied to buffer 168. Thus the Hen waveform, when high (Hen=1), selects the output of the horizontal counter 88a to address the horizontal section 158 to thus sequentially read the outputs from the 910 locations of section 158 for each line of the picture. Moreover, during the occurrence of Hen, the output of the vertical counter 88b is selected to address section 160 to thus sequentially read the contents of locations 1-525 for each frame. Hen is generated only during the horizontal blanking period and accordingly the vertical waveform data stored in section 160 is selected only during the horizontal blanking period. Ven of FIG. 10(c) is also generated during the horizontal blanking interval and enters the vertical waveform data into latch 154. The horizontal waveform data is latched in latch 152 by the pixel clock. The outputs of latches 152 and 154 are applied to AND circuit 156 to produce the mask generator output signal.

The pixel clock is driven from a 13.5MHz oscillator which is phase locked to the program input video. The pixel (horizontal) counter 88a and vertical (line) counter 88b are clocked by the pixel clock and divider 90a, these counters being reset by the input sync signal. The control waveforms Hen and Ven of FIGS. 10(b) and 10(c) (and the control waveforms of FIGS. 12 and 13) may be generated by conventional techniques such as the use of PROM's as look up tables with the pixel/line counters as addresses.

Figure 12:
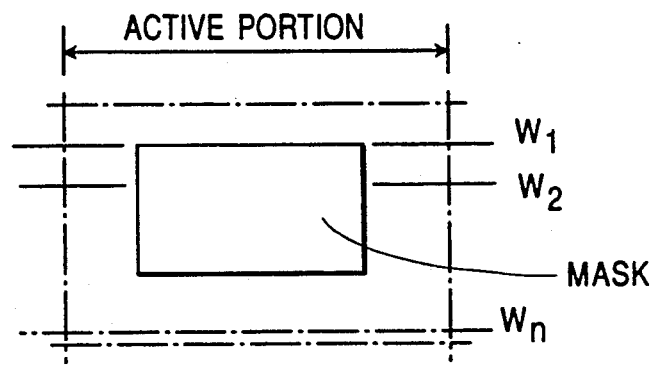
FIG. 12 depicts a mask area used to illustrate the operation of the circuitry of FIG. 11.

Referring to FIGS. 11-13, there is illustrated a another embodiment of mask generator 82 of FIG. 7. Block 172 corresponds to DPR 150, clock 85, divider 90a, horizontal counter 88a, vertical counter 88b, and buffers 166 and 168 of FIG. 9. In order to reduce the amount of time required to write the horizontal and vertical rectangular mask waveform data of FIG. 8 into sections 158 and 160 of DPR 150, the FIG. 11 embodiment is employed. In general, the horizontal and vertical rectangular waveforms of FIG. 8 are derived from four single pixel values which mark the horizontal waveform start and finish and the vertical waveform start and finish. In particular, assuming the horizontal and vertical waveforms are defined as above, data would be written into the horizontal section 158 of DPR 150 only in pixels 220 and 470—that is, ONE's would be written into these two memory locations and ZERO's would be written into the remaining locations. Moreover, in the vertical section 160 ONE's would be written into only locations 50 and 180 while ZERO's would be written into the remaining locations. Thus it can be seen that the number of addresses which must be written is substantially reduced with respect to the FIG. 9 embodiment. This is advantageous in that a ZERO must be written to any address which was ONE and is now required to be ZERO as would occur at the transition from a mask area to a non-mask area. In practice, this means that all addresses are written on every field. Hence, by reducing the write time, it becomes easier to write all the addresses defining the horizontal and vertical waveform data of FIG. 8 on every field in the FIG. 11 embodiment.

The output data from DPR 1-05 is applied over line 170 to a horizontal JK flip-flop 174 and to a vertical JK flip-flop 176. Flip-flops 174 and 176 respectively generate the horizontal and vertical waveforms of FIG. 8. These waveforms are applied to AND circuit 156 to generate the mask generator output signal. Connected to read/write line 170 is a buffer 178, the input of which is connected to ground (or logic ZERO) 180. Connected to the write enable terminal of dual port ram 150 is the output of a NAND circuit 180, the NAND gate being responsive to a horizontal clear signal Hcl (FIG. 12(f)) and a vertical clear signal Vcl (FIGS. 12(d) and 13(d)).

Referring to FIG. 12, the mask of FIG. 8 is illustrated and waveforms associated with the active portion of the horizontal line $w_1$ corresponding to the uppermost line of the mask are shown in FIGS. 12(a)-12(f) while waveforms associated with the active portion of an arbitrary horizontal line $w_2$ intersecting the mask are illustrated in FIGS. 13(a)-13(e) where the waveforms of FIGS. 12 and 13 are approximately shown as they occur relative to each other. The multiplexing waveform Hen selects the first and last values of both the horizontal and vertical waveforms from dual port ram 150, the multiplexing function of Hen being described above with respect to FIG. 9. The DPR output waveforms of FIGS. 12(a) and 13(a) are applied to the horizontal and vertical flip-flops 174 and 176. These flip flops generate the complete horizontal and vertical waveforms which are applied to AND circuit 156 as also described above with respect to FIG. 9.

The horizontal JK flip-flop is reset at the start of each line by HRES (FIGS. 12(c) and 13(e)) and the vertical JK flip-flop is reset at the start of each field by Hcl, as will be further described below. The output of circuit 180 is applied to- the write enable input of the dual port ram. This output also enables buffer 178. Thus, since, as stated above, the input to buffer 178 is logic ZERO and since Vcl is valid immediately after the vertical waveform data is read on each line and before the vertical counter 88b is deselected, the Vcl output from NAND 180 clears (or deletes) the vertical waveform which has just been read. That is, upon the occurrence of Vcl, buffer 178 is enabled to apply a logic zero to the location which has just been read to thus delete it. Accordingly, at the end of each field the dual port ram contains no vertical data. Moreover, the horizontal data is cleared using the Hcl output from NAND 180 which output is valid for each horizontal line. That is, with each application of Hcl to buffer 178, the horizontal waveform data just read is also deleted. Hence, in the foregoing manner DPR 150 is zeroed at the end of each field, by the Hcl and Vcl control signals. In this regard, note the Hcl signal generated at the end of each field, as indicated by the horizontal line $W_n$ of FIG. 12, also acts as the vertical reset signal, $V_{RES}$, to JK flip-flop 176.

The embodiment of FIG. 11 is desirable in that the writing time to the DPR 150 is substantially reduced as discussed above. Moreover, this embodiment is desirable in that the horizontal and vertical waveform data is completely deleted from the DPR at the end of each field. This further simplifies the writing of the DPR by processor 82 at the beginning of the next field in that the new data simply has to be written into the first and last values in both the horizontal and vertical waveform sections for the next field without having to remember (and zero) which locations the foregoing values were stored in for the previous field.

In a further embodiment of a mask generator for use in the invention, a large digital storage device is employed as parameter storage device 26 of FIG. 1. Rather than use memory 150 of FIGS. 9 or 11 to store horizontal and vertical waveform data as described above, processor 82 directly writes the mask configurations into a pixel based, parameter store 26, a pixel based memory being characterized by an array of memory cells where each cell corresponds to a pixel of the raster and where within each mask configuration are stored the control values for that mask. Only one memory plane would typically be employed for one bit digital control signals while a plurality of memory planes would typically be employed for analogue or multi-bit digital control signals. A stand-alone mask generator utilizing a pixel based memory is sold by Abacus-Cox Electronics. The use of a pixel based mask generator of this type is advantageous in that any mask shape can be written into it whereas the generators of FIGS. 9 and 11 are limited to the generation of rectangular shaped masks. However, the amount of storage required to implement the mask generator of the above pixel based, memory embodiment is substantial compared to that utilized in the embodiments of FIGS. 9 and 11. Accordingly, when the masks are rectangular in configuration, as is typically the case, the embodiments of FIGS. 9 and 11 are preferred.

Figure 14:
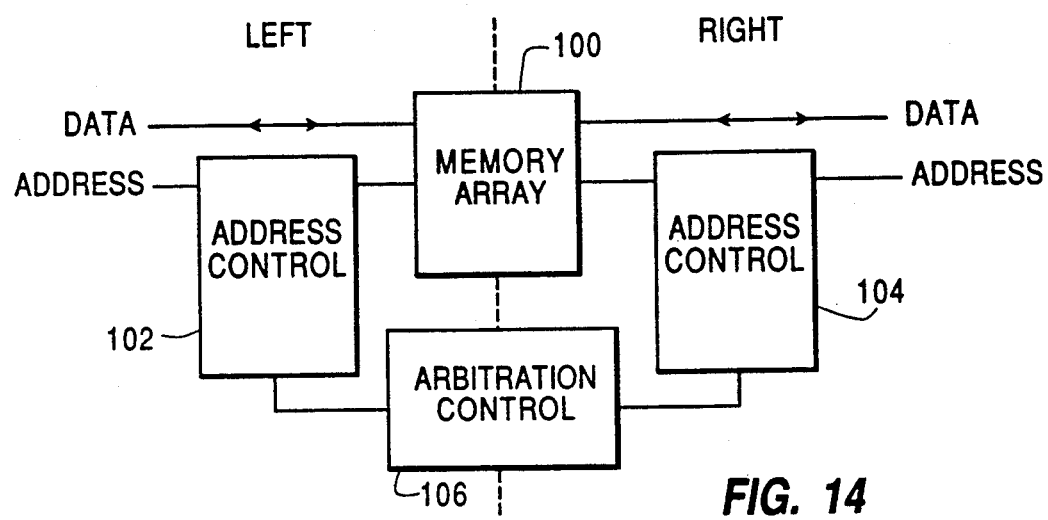
FIGS. 14 and 15 are block diagrams of illustrative dual port ram circuitry for use with the control circuitry of FIG. 7.
Figure 15:
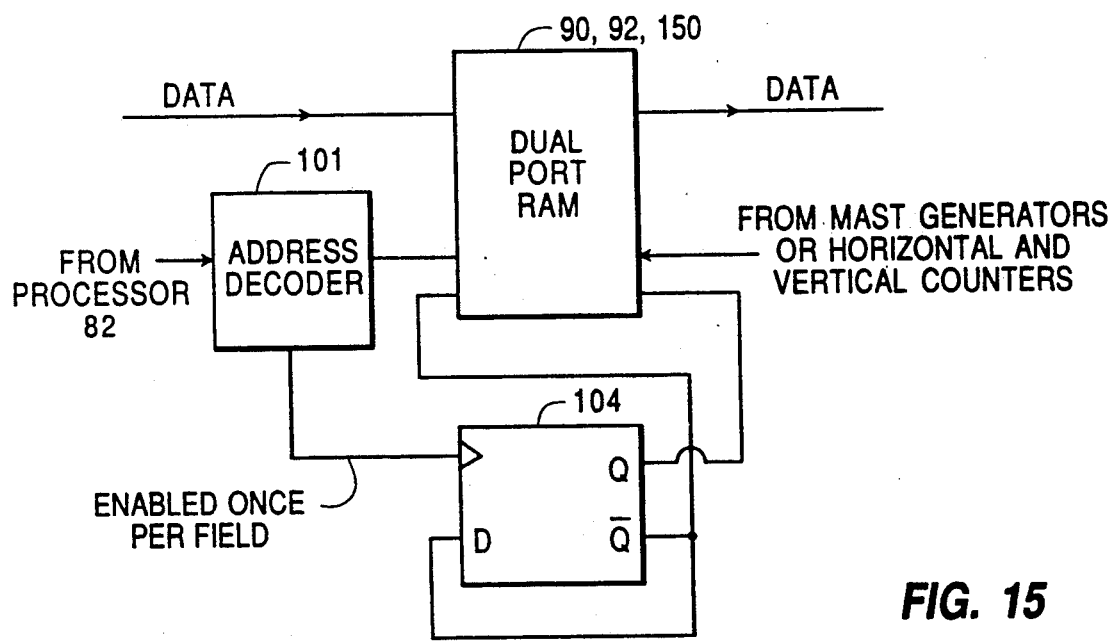

The potential conflict of the processor 82 and the mask generators addressing the LUT's of FIG. 3 at the same time is preferably resolved by using the dual port rams 90 and 92 of FIG. 7 (such as the IDT7130 from Integrated Device Technology). FIG. 14 shows a simplified block diagram of a conventional dual port ram where the dual port ram 90, 92 of FIG. 15 (or DPR 150 of FIGS. 9 or 11) corresponds to FIG. 14. The control memory area 100 can be addressed by either the left or right side address controls 102 or 104. In the event of simultaneous addressing by both sides the arbitration control 106 postpones the enabling of one side. In the present application, the side controlled by processor 82 may be postponed but the side addressed by the mask generators must never be postponed. To overcome this problem, the 1024 byte address space of memory array 100 is split into two 512 byte pages. Page one is written by processor 82 while page two is addressed by the mask generators (in the case of DPR's 90 or 92) or the horizontal and vertical counters 88 (in the case of DPR 150). At each vertical interval, processor 82 addresses latch 104 via decoder 101 and the two pages interchange. Latch 104 is arranged by connecting the data input to the inverting output to change the output state at every access. The inverting output is used as the input page address and the noninverting output is used as the output page address. This technique allows constant access by the processor to the input side of dual port rams 90, 92, and 150.

RAM-DAC 95 may also incorporate a dual port ram. If a dual port ram feature is not utilized in the RAM-DAC, the digitized analogue control values may be written into the RAM-DAC during each vertical blanking interval. The foregoing is applicable also to the other memory devices which have been implemented by DPR's including DPR's 90, 92, and 150. However, implementation with the DPR's is advantageous since writing from the processor can occur continuously whereas, if writing occurs .only during the vertical retrace va., a significant requirement may- be --. on the writing process because the values of the data stored in DPR's 90, 92 and 150 are preferably refreshed every frame.

Figure 16:
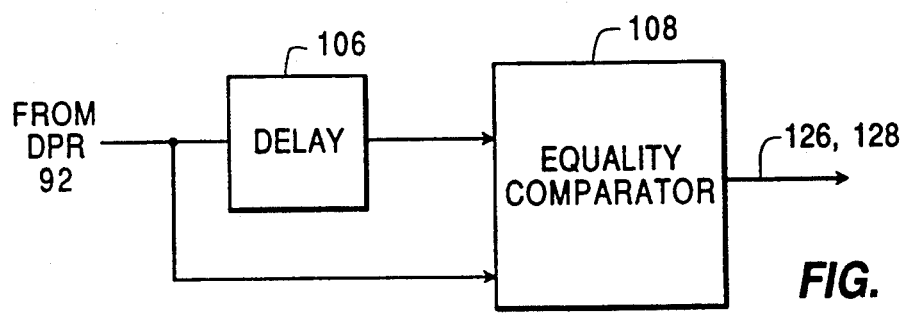
FIG. 16 is a block diagram of the illustrative edge masker circuitry for use with the control circuitry of FIG. 7.

FIG. 16 shows an optional edge masker, the edge masker being generally indicated at 98 in FIG. 7. Its purpose is to provide a key inhibit signal during the transition from one mask to the next. The key inhibit signal is applied over lines 126 and/or 128 to inhibit the keying signal (as is discussed below with respect to FIGS. 18-21) and thus control the transitions between masks. That is, picture quality may be somewhat degraded in the transition portion from one mask to another especially when one mask is placed within another mask, for example. To minimize such degradation, edge masker 98 inhibits the keying signal during transitions from one mask to another.

Figure 17A:
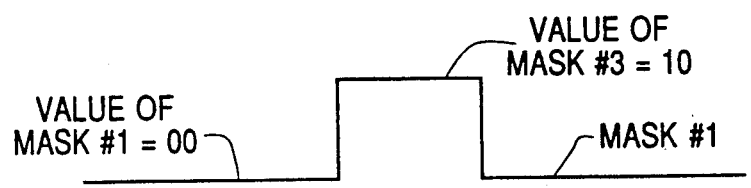
FIGS. 17(a), 17(b), and 17(c) are illustrative waveforms occurring at different points in the circuitry of FIG. 16.
Figure 17B:
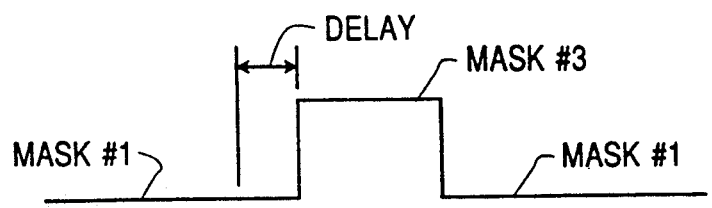
Figure 17C:
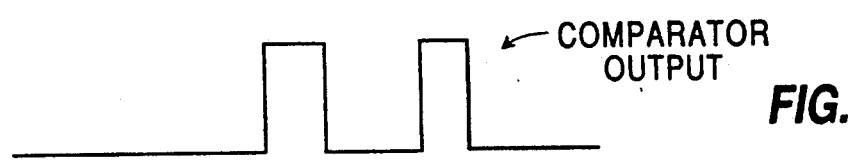

The input to the edge masker is from priority DPR 92 and for four masks, this is a two bit number indicating the highest priority mask, as discussed above. This input is delayed by a delay 106, the delay being at least one pixel long and typically an integral number of pixels long. The delayed input is compared with the undelayed input in an identity comparator 108 such as a 74AC521. The output of the comparator changes state (from zero to one) whenever the inputs are not equal, as shown in FIGS. 17(a)-17(c) where the pulses of FIG. 17(c) act as key inhibit pulses over lines 126 and/or 128 at the transitions between masks. The position of the pulse in relation to the actual video signal is decided by the various video delays inserted in the video signal path. Since the mask edges are derived from the master clock, the edge delay can be obtained using a "D type" latch. If the masks are rectangular, the edge delay can be increased to any convenient length; however, if the masks are non-rectangular in configuration, .it may be necessary to include the intermediate delayed values in the comparison.

From the foregoing, it can be seen that control circuitry 12 should, in general, includes mask generators to generate a plurality of masks, which define the areas in which each key is to be active. The mask generators can generate more masks than the number of key sources, if desired, because each key and fill source may be used in more than one area of the picture. For example, a single title card used with a single camera as a key source can be subdivided into several areas, each for separate use.

In general, parameter store 26 of FIG. 1 includes (a) means such as dual port ram 90 for storing digital parameters (e.g. on-off type commands, key inhibit control, key input selection, etc.) for each mask area; and (b) means such as RAM-DAC 95 for storing digitized linear (or analog) parameters (e.g. clip level, color parameters, key dissolve control, etc.) for each mask area. Moreover, means for multiplexing the digital and analogue control parameters so that they can be time shared by circuitry 10 include counters 88a and 88b and the mask generators for directing the stored digital and analogue parameters to their associated circuit destinations, the operation of the multiplexing means being synchronized to the television scanning process and the definitions of corresponding mask locations on the television raster.

In a system having a hybrid analog/digital circuit implementation, multiplexing of the digital and analogue control values can be implemented by several other approaches where a first approach may include (a) a digitized parameter store (e.g. 8 bits per parameter multiplied by the number of parameters per mask multiplied by the number of masks); (b) a multiplexer able to scan all parameters of (a) in t he time of one TV field or frame; (c) a digital to analog converter fed from (b); (d) a demultiplexer fed from (c) and in turn feeding a number of sample and hold analog voltage stores, the demultiplexer operating at the same rate as the multiplexer of (b); and (e) a demultiplexer per parameter employed per masked area, such demultiplexer to be synchronized to the television scanning process and the definition of corresponding mask locations on the television raster. This approach permits the use of somewhat slower, fewer and less expensive D to A convertors; but requires more components.

A second approach may include (a) a number of digitized parameter stores, one store for each parameter (e.g. 8 bits per parameter multiplied by the number of masks); (b) a demultiplexer per parameter store of (a), each such demultiplexer to be synchronized to the television scanning process and the definition of corresponding mask locations on the television raster; and (c) a fast digital to analog convertor fed from (b). Each such DAC would control one parameter for all masked areas.

In both of the above approaches, the data input to each store of (a) typically is applied from a computer bus such as from processor 22 (or 82). In particular, the processor loads the storage means with digitized linear and digital values as appropriate to each mask area. Control panel 20 having suitable means for the manual entry of data to define the desired operation of the system is also employed. Such a panel would typically incorporate pushbuttons, potentiometers and visual means of confirming the selections made, as is conventional.

As is also conventional, appropriate interface circuitry, as required to properly connect the various signal path sources and destinations, and suitable delay means where required, to facilitate the correct timing relationships of all video signal and control paths, would be employed.

To the basic system described in FIG. 1, it is desirable to add circuits for previewing the key prior to final use on the main output (Program) channel over line 14a. Circuits for enabling each keyed area to be independently transitioned (cut, dissolve or wipe) on at least the main output (and also on the preview output) are also desirable. Means for previewing the transitions are also preferred.

Figure 18:
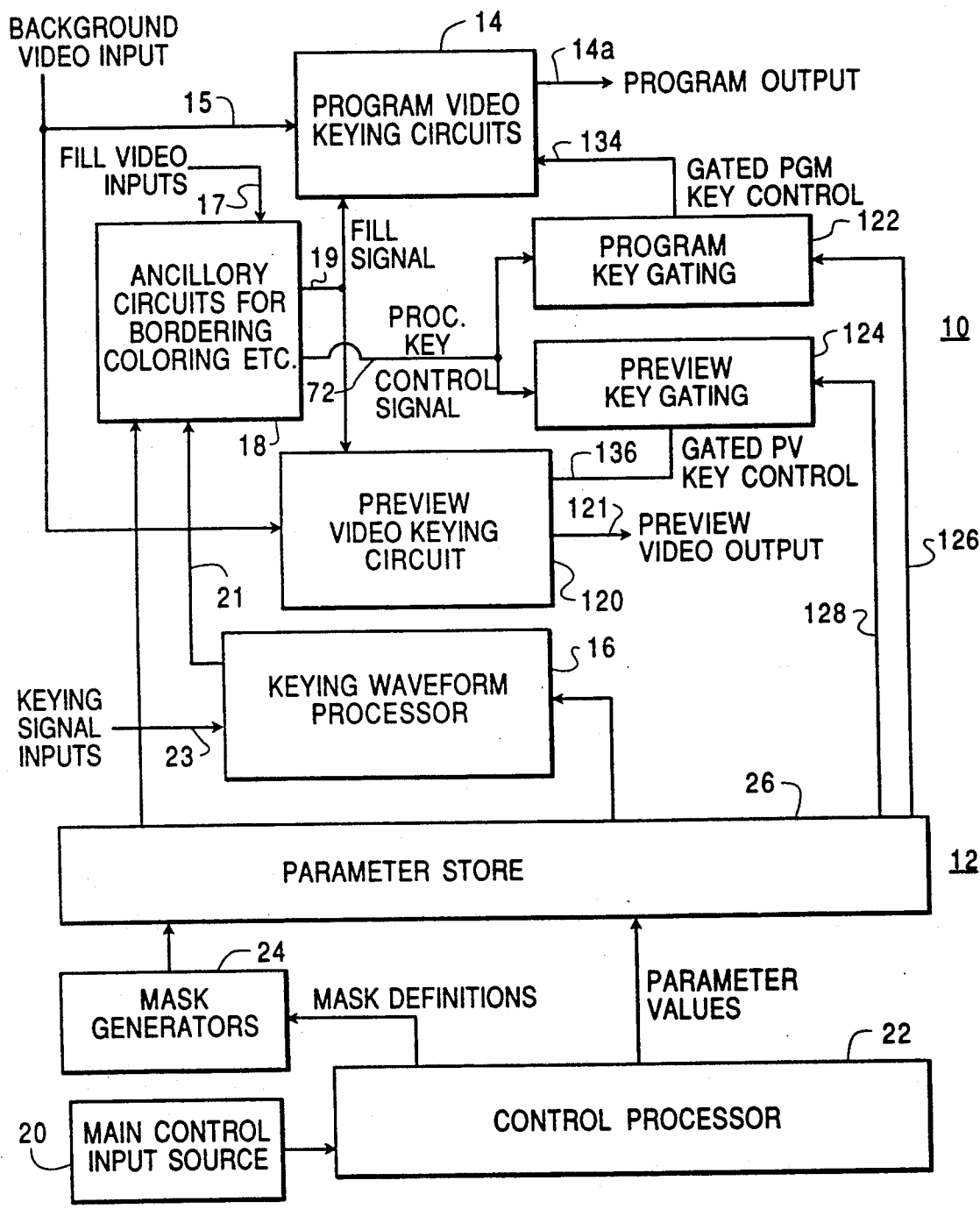
FIG. 18 is a block diagram of the illustrative basic system of FIG. 1 modified to incorporate preview and transition circuitry.

Accordingly, as shown in FIG. 18, a second video keying circuit 120 may be added to the basic system of FIG. 1 to enable the previewing of keys. This circuit may receive the same background video and fill signals as the main (Program) keying circuit 14.

The processed keying control signal for each of the Program (PGM) and Preview (PV) circuits must be modified to allow only the appropriate keying to take place in each circuit. This is accomplished by the addition of Key Gating circuits 122 and 124 to the PGM and PV processed keying signal paths.

The Key Gating circuits 122 and 124 operate under the control of multiplexed key enable signals over lines 126 and 128, respectively from parameter store 26. Where a key is required on either the PGM or PV video output, the appropriate keying control signal is enabled under the control of processor 22. Otherwise, any keying control signal is typically inhibited.

The use of key gating may be readily adapted to effect key transitions on either or both the PGM or PV channels. If the multiplexed key enable signals on lines 126 and 128 are varied in amplitude and the gating is accomplished by an "analogue (or levelresponsive) AND" circuit, as described below, the resultant keying control signals applied to the PGM and/or PV keying circuits 14 and 120 will be varied in amplitude with respect to time. This will cause a dissolve effect of the resultant key to occur. A key enable signal, the pulse width of which varies with time will produce a wipe effect. If the leading edge of the foregoing pulse is inclined, a soft wipe is produced—that is, a mix of a dissolve and a hard wipe.

Figure 19:
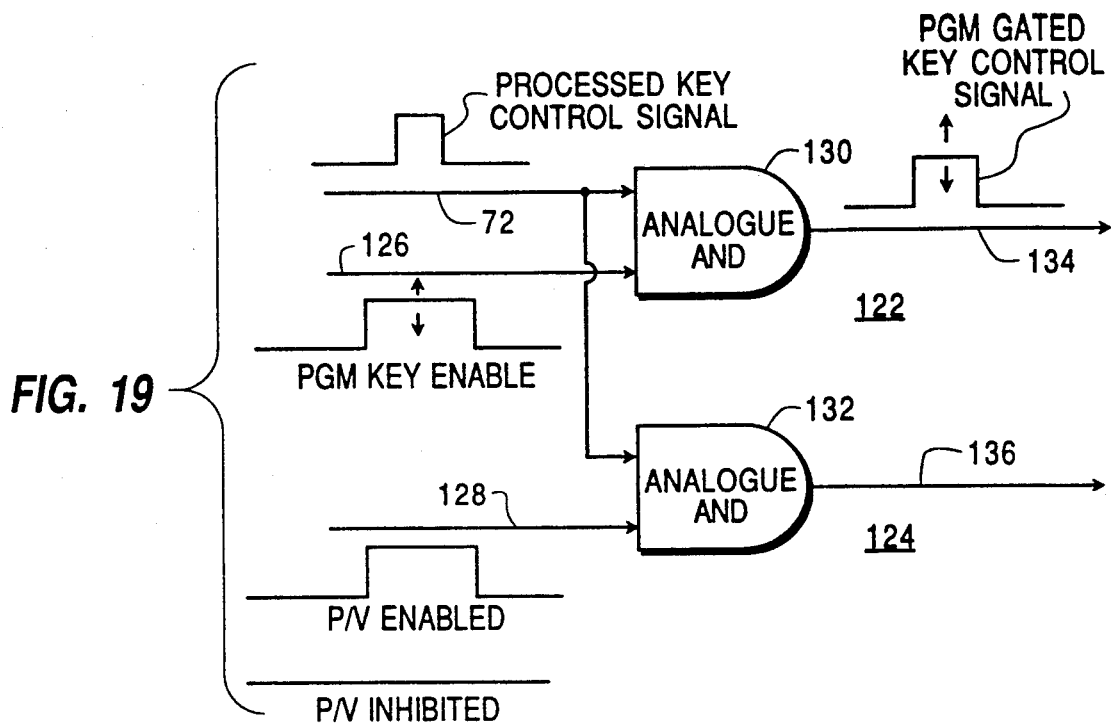
FIG. 19 is a block, schematic diagram of preview and transition circuitry for use with the circuitry of FIG. 18.

Reference should be made to FIG. 19 which illustrates program key gating circuit 122 and preview key gating circuit 124. The processed keying control signal is applied over line 72 (FIGS. 1 and 2) to analogue D circuits 130 and 132. Also applied to analogue D gate 130 over line 126 is the program key enable signal, the amplitude and/or width of which may be varied, as discussed above, to provide a dissolve, hard wipe, or soft wipe transition. At the output of analogue AND gate 130 occurs the gated program key control signal applied over line 134 to program video keying circuit 14.

Applied over line 128 to analogue AND circuit 132 is a preview key enable signal. Also applied to analogue AND gate 132 is the processed keying control signal from line 72. The output of analogue AND gate 132 is applied as the gated preview key control signal over line 136 to the preview video keying circuit 120.

The operation of the circuitry illustrated in FIGS. 18 and 19 is such that the preview output on line 121 from preview video keying circuit 120 is inhibited, if the next transition is to result in the removal of the key. This provides a true preview of the upcoming situation. Thus, the preview key enable signal applied over line 128 is a digital control signal of the type stored in LUT 90 of FIG. 3 where this digital control signal would be synchronized to the television scanning process and the definition of corresponding mask locations on the television raster as any of the other digital control signals described hereinbefore with respect to FIGS. 3 and 7

The program key enable signal applied to line 126 may have the amplitude thereof varied with respect to time to thus provide a dissolve transition as discussed above. Accordingly, since this transition capability is provided for the program signal, the program key enable signal of FIG. 19 is an analogue control signal of the type stored in LUT 99 of FIG. 3. This analogue control signal, like the preview key enable digital control signal, is also synchronized to the television scanning process and the definition of corresponding mask locations on the television raster as are the other analogue control signals described hereinbefore with respect to FIGS. 3 and 7. Moreover, in order to vary the amplitude of the program key enable analogue signal with respect to time, RAMDAC 95 of FIG. 7 has the contents thereof changed every 1/60 of a second, for example.

If it is desired to provide a transition capability at the preview output 121, this can be effected by also adjusting the amplitude of the preview key enable signal so that it also is an analogue control signal of the same type as the program key enable analogue signal used to control transitions at the program output.

As discussed above, the program key enable waveform is illustrated adjacent line 126 and the preview key enable waveform is illustrated adjacent line 128 in FIG. 19. Moreover, the processed key control signal is illustrated adjacent line 72. The duration of the program and preview key enable waveforms is such that these waveforms are high only in the area of the applicable mask. They will be low elsewhere. The analogue AND gates 130 and 132 will be actuated whenever their respective enable signals are high to thus pass the processed key control signals.

If the preview key inhibit signal is applied over line 128 (the preview inhibit signal being also illustrated in FIG. 19), the keying signal will be inhibited on line 136. Accordingly, the fill video signal will not be inserted into the background video signal by preview video keying circuit 120. Thus, if it is intended to inhibit the preview output for a particular key the foregoing preview inhibit signal will effect t he removal of the key. Hence, a true preview of the upcoming situation is provided.

Figure 20:
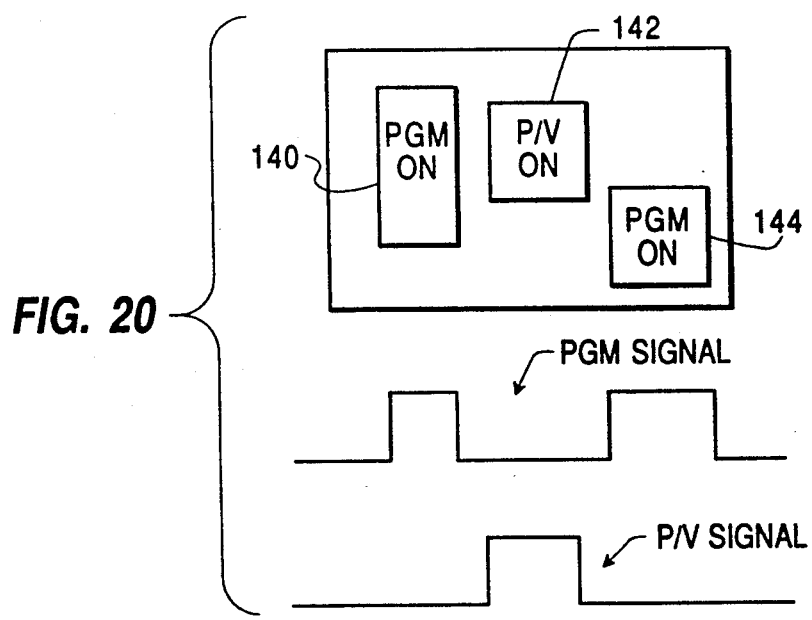
FIG. 20 illustrates a television picture signal having three mask areas and the configuration of program and preview enable waveforms for use therewith.

To further illustrate the operation of the program and preview key enable and inhibit signals, reference should be made to FIG. 20 where three mask areas are illustrated. The first mask area 140 and the third mask area 144 will be ON (that is, present in the program output from keying circuit 14) because the program key enable signal illustrated in FIG. 20 will be high during the times corresponding to mask 140 and low during the time corresponding to mask 142. Mask area 142 will be displayed at t he preview output from keying circuit 120 while mask areas 140 and 144 will not due to the shape of the preview key enable signal illustrated in FIG. 20.

Figure 21:
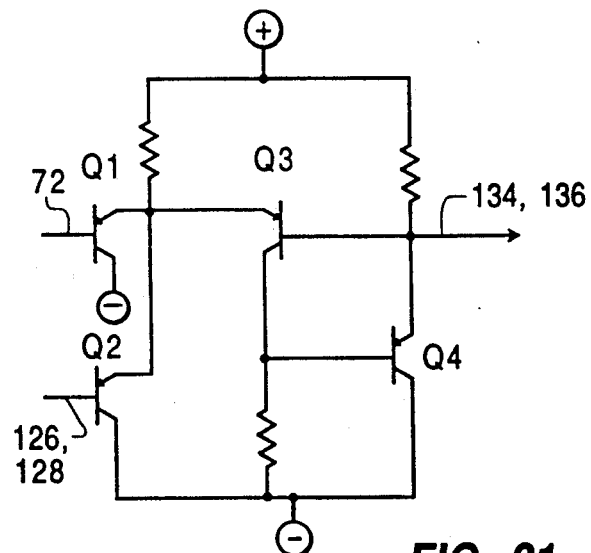
FIG. 21 is a simplified schematic diagram of an illustrative analogue AND circuit for use with the circuitry of FIG. 19.

Reference should now be made to FIG. 21 which is a simplified schematic diagram of analogue AND gates 130 and 132. The analogue gate is comprised of transistors Q1 and Q2 where if the inputs on lines 72 and 126 or 128 cause transistors Q1 and Q2 to conduct, an output is applied at the emitter of Q1 to a level shifting circuit comprised of transistors Q3 and Q4, the purpose of the level shifter being to compensate for $V_{BE}$ of transistors Q1 and Q2. An output is obtained at the emitter of Q4 on lines 134, 136.

From the foregoing, it can be seen that transitions of the keys can be effected, either on the program channel or on the preview channel for the purpose of transition preview. The preview output can be caused to always provide an output corresponding to a correct preview of the next appearance of the program output, for any combination of key transitions in any keyed areas.

In the embodiment of FIGS. 18 and 19, keying waveform processor 16 is shared by both the program video keying circuit 14 and the preview video keying circuit 120. Accordingly, the transition in any keyed area (or mask area) will be from a keyed image to the background video input or vide versa. If the transition is to be from a first keyed image to a second keyed image in a given mask area and it is desired to preview such a transition, keying waveform processor 16 would not be shared; rather, a second keying waveform processor (not shown) would be provided for the second keyed image where each keying waveform processor would operate in a time share manner as described hereinbefore in accordance with the invention and where the first keying waveform processor would be associated with program key gating circuit 122 and the second keying waveform processor would be associated with Preview key gating circuit 124. Moreover, the first keyed image can be inserted into a mask area, the dimensions and/or shape of which are different from the mask area into which the second keyed image is inserted by providing separate mask generators for the program and preview outputs.

Transitions may also be effected without using the above described key gating FIGS. 18- 21 to accomplish transitions. That is, as disclosed in U.S. Pat. No. 4,205,346, assigned to the assignee of the present application and incorporated herein by reference, - the program and preview outputs may be connected into a device capable of producing video transitions between two sources, and using this device for all transitions. A second such device, as also disclosed in the foregoing patent, with inputs connected in parallel with the first device would produce a preview of the transition.

What is claimed is:

1. Multi-keying circuitry for a television signal comprising:
    keying means for keying at least one fill video signal into a background video signal in response to at least one modified keying signal;
    keying signal processing means for modifying at least one keying signal in response to at least one control signal to thus obtain said one modified keying signal; and
    control means for generating said control signal at at least two different time periods during a raster scan of the television signal where said two different time periods respectively correspond to two different predetermined mask portions of the raster;
    whereby the modification of the keying signal by the processing means during each said time period is a function of the value o the control signal during that time period to thus effect time sharing of the keying signal processing means by the control means during the raster scan.

2. Multi-keying circuitry as in claim 1 including selecting means for selecting at least one of a plurality of said keying signals in response to at least one of said control signals.

3. Multi-keying circuitry as in claim 1 including selecting means for selecting at least one of a plurality of said fill video signals in response to at least one of said control signals.

4. Multi-keying circuitry as in claim 1 including means for non-additively mixing the fill video signal and the background video signal and means for selecting either said keying means or the non-additive mixing means in response to one of said control signals.

5. Multi-keying circuitry as in claim 1 where said mask portions of the raster are rectangular in configuration.

6. Multi-keying circuitry as in claim 1 where at least one of said mask portions of the raster is nonrectangular in configuration.

7. Multi-keying circuitry as in claim 1 where said mask portions of the raster are in non-overlapping relationship.

8. Multi-keying circuitry as in claim 1 where said mask portions of the raster are in overlapping relationship.

9. Multi-keying circuitry as in claim 1 where the value of the control signal during the first time period is different from that during the second time period.

10. Multi-keying circuitry as in claim 1 where the value of the control signal during the first time period is the same as that during the second time period.

11. Multi-keying circuitry as in claim 1 where said keying signal processing means is responsive to a plurality of said control signals and where said control means time shares the keying signal processing means by generating said plurality of control signals during each of said two different time periods.

12. Multi-keying circuitry as in claim 11 where said keying signal processing means includes clipping means for clipping the keying signal where the clipping level is a function of a the value of control signal associated with the clipping means.

13. Multi-keying circuitry as in claim 11 where said keying signal processing means includes means for amplifying the keying signal where the gain of the amplifying means is a function of the value of a control signal associated with the amplifying means.

14. Multi-keying circuitry as in claim 11 where said keying signal processing means includes inverting means for inverting the keying signal in response to a predetermined value of a control signal associated with the inverting means.

15. Multi-keying circuitry as in claim 11 where said keying signal processing means includes border means for adding a border signal to the fill video signal in response to a predetermined value of a control signal associated with the border means.

16. Multi-keying circuitry as in claim 11 where said keying signal processing means includes dropshadow means for adding a drop-shadow signal to the fill video signal in response to a predetermined value of a control signal associated with the drop-shadow means.

17. Multi-keying circuitry as in claim 11 where said keying signal processing includes outline coloring means for adding an outline coloring signal to the fill video signal in response to a predetermined value of a control signal associated with the outline coloring means.

18. Multi-keying circuitry as in claim 1 where said control means includes control signal storage means for storing the respective values of the control signals during said two different time periods and mask generating means for applying said control signals from said storage means to said keying signal processing means during said two different time periods to thus effect said time sharing of the keying signal processing means by the control means.

19. Multi-keying circuitry as in claim 18 where said control signal storage means includes a dual port ram so that current values of the control signals can be read from the dual port ram at the same time that future values can be written into the dual port ram.

20. Multi-keying circutry as in claim 19 where said control signal storage means stores digital control signals.

21. Multi-keying circuitry as in claim 19 where said control signal storage means stores digitized, analogue control signals.

22. Multi-keying circuitry as in claim 18 including priority means for determining which value of the control signal should be applied to the keying signal processing means when said two different time periods overlap.

23. Multi-keying circuitry as in claim 22 where said priority means includes a dual port ram.

24. Multi-keying circuitry as in claim 24 including means responsive to said priority means for inhibiting the keying signal processing means during transitions from one of said predetermined mask portions to another of the predetermined mask portions 25. Multi-keying circuitry as in claim 18 including means for inhibiting the keying signal processing means during transitions from one of said predetermined mask portions to another of the predetermined mask portions.

26. Multi-keying circuitry as in claim 18 where said mask generating means includes mask data storage means for storing mask data defining the configurations of the different predetermined mask portions of the raster.

27. Multi-keying circuitry as in claim 26 where said mask a a storage means includes a dual port ram so that current values of he mask data can be read from the dual port ram at the same time that future values can be written into the dual port ram.

28. Multi-keying circuitry as in claim 27 where said mask generating means includes means for immediately deleting the current mask values of the data after it has been read to thereby simplify the writing of the future values of the mask data.

29. Multi-keying circuitry as in claim 26 where said mask generating means stores mask data corresponding to current values of the mask data and thereafter stores mask data corresponding to future values of the mask data and where said mask generating means includes means for immediately deleting the current mask data after it has been read to thereby simplify the writing of the future mask data.

30. Multi-keying circuitry as in claim 26 where the mask data storage means is a pixel based memory characterized by an array of memory cells where each cell corresponds to a pixel of the raster and where the mask data defines the configuration of each predetermined mask portion by storing the actual configuration of the predetermined mask portion in the pixel based memory.

31. Multi-keying circuitry as in claim 26 where the configuration of each predetermined mask portion is rectangular and the configuration is defined by storing (a) data corresponding to the location of the horizontal dimension of the predetermined mask portion with respect to the horizontal dimension of the raster in a first section of the mask data storage means and (b) data corresponding to the location of the vertical dimension of the predetermined mask portion with respect to the vertical dimension of the raster in a second section of the mask data storage means.

32. Multi-keying circuitry as in claim 26 where the configuration of each predetermined mask portion is rectangular and the configuration is defined by storing (a) data corresponding to the location of the beginning and end points of the horizontal dimension of the predetermined mask portion with respect to the horizontal dimension of the raster in a first section of the mask data storage means and (b) data corresponding to the location of the beginning and end points of the vertical dimension of the predetermined mask portion with respect to the vertical dimension of the raster in a second section of the mask data storage means.

33. Multi-keying circuitry as in claim 18 where the control signal storage means stores digitized, analog control signals and where said control circuitry includes digital-to-analogue convertor means for converting the digitized, analog control signals to analog control signal.

34. Multi-keying circuitry as in claim 33 where said control signal storage means and said digital-to-analogue converter means are combined into a RAM-DAC.

35. Multi-keying as in claim 1 including transition means for effecting a transition in at least one o the mask portions of the raster with respect to at least the fill video signal associated with said one mask portion.

36. Multi-keying circuitry as in claim 35 where said transition means includes means for effecting said transition at each of said mask portions at the same time.

37. Multi-keying circuitry as in claim 35 where said transition means includes program keying signal gating means responsive to (a) the modified keying signal and (b) one of said control signals to effect said transition.

38. Multi-keying circuitry as in claim 37 including a further keying means for previewing the next event at at the least one of the mask portions.

39. Multi-keying circuitry as in claim 38 where said previewing means includes means for previewing the respective next events at each of said mask portions at the same time.

40. Multi-keying circuitry as in claim 38 including preview keying signal gating means responsive to (a) the modified keying signal and (b) a further one of said control signals to effect said preview.

41. Multi-keying circuitry as in claim 35 where said transition is also with respect to the background video signal associated with said one mask portion.

42. Multi-keying circuitry as in claim 35 where said transition is also with respect to a further fill video signal associated with said one mask portion.

43. Multi-keying circuitry as in claim 1 including a further keying means for previewing the next event at at the least one of the mask portions.

44. Multi-keying circuitry as in claim 41 where said previewing means includes means for previewing the respective next events at each of said mask portions at the same time.

* * * * *